US012692914B2

(12) United States Patent
Voth et al.

(10) Patent No.: US 12,692,914 B2
(45) Date of Patent: Jul. 28, 2026

(54) APPARATUS AND METHOD FOR BRAKING MECANUM WHEELS

(71) Applicants: Jason Andrew Voth, Maplewood, MN (US); Joshua David Petry, Arden Hill, MN (US); Noah Bradley Praske, St. Paul, MN (US); Emma Ruth Praske, St. Paul, MN (US); Seth Thomas Dodds, Lake Elmo, MN (US); Roman Martin Lefler, Stillwater, MN (US); Eric Jon Voth, Maplewood, MN (US)

(72) Inventors: Jason Andrew Voth, Maplewood, MN (US); Joshua David Petry, Arden Hill, MN (US); Noah Bradley Praske, St. Paul, MN (US); Emma Ruth Praske, St. Paul, MN (US); Seth Thomas Dodds, Lake Elmo, MN (US); Roman Martin Lefler, Stillwater, MN (US); Eric Jon Voth, Maplewood, MN (US)

(73) Assignee: Eric Jon Voth, Maplewood, MN (US)

( * ) Notice: Subject to any disclaimer, the term of this patent is extended or adjusted under 35 U.S.C. 154(b) by 365 days.

(21) Appl. No.: 18/423,451

(22) Filed: Jan. 26, 2024

(65) Prior Publication Data

US 2024/0263678 A1 Aug. 8, 2024

Related U.S. Application Data

(60) Provisional application No. 63/443,040, filed on Feb. 2, 2023.

(51) Int. Cl.
*F16D 55/226* (2006.01)
*B60T 1/00* (2006.01)
(Continued)

(52) U.S. Cl.
CPC ........... *F16D 63/006* (2013.01); *B60T 1/005* (2013.01); *B60T 1/04* (2013.01); *B60T 13/746* (2013.01);
(Continued)

(58) Field of Classification Search
CPC ... B60B 27/00; B60B 19/003; B60B 27/0047; B60B 27/0052; F16H 11/10; F16D 65/092
See application file for complete search history.

(56) References Cited

U.S. PATENT DOCUMENTS

| | | | |
|---|---|---|---|
| 11,039,964 B2 * | 6/2021 | Paul | A61G 1/0237 |
| 2018/0050563 A1 * | 2/2018 | Zhang | B60B 19/12 |

(Continued)

FOREIGN PATENT DOCUMENTS

| | | | | |
|---|---|---|---|---|
| KR | 20250030621 A * | 3/2025 | | B60B 19/003 |

*Primary Examiner* — Stacey A Fluhart

(57) ABSTRACT

The present invention provides a method and apparatus for braking mecanum or omnidirectional wheels, by applying force to the rollers of a mecanum or omnidirectional wheel to prevent them from rolling when in contact with the ground or the floor. In some embodiments, it engages the rollers with teeth, rods, or wedges to generate friction and prevent them from rotating. The teeth, rods, or wedges rotate with the mecanum or omnidirectional wheel on the same axle, so the force can be applied and the rollers braked whether the wheel is rotating or not. In some embodiments, the force is applied using a servo or motor to push a thrust bearing, which then engages the rollers. In some embodiments, the servo or motor applies force using one or more gear racks, levers, cam wheels, or mechanical linkages.

19 Claims, 7 Drawing Sheets

(51) Int. Cl.

| | |
|---|---|
| B60T 1/04 | (2006.01) |
| B60T 13/74 | (2006.01) |
| F16D 63/00 | (2006.01) |
| F16D 65/18 | (2006.01) |
| B60B 19/00 | (2006.01) |
| F16D 121/20 | (2012.01) |
| F16D 121/24 | (2012.01) |
| F16D 125/24 | (2012.01) |
| F16D 125/36 | (2012.01) |
| F16D 125/64 | (2012.01) |
| F16D 125/68 | (2012.01) |
| F16D 127/02 | (2012.01) |

(52) U.S. Cl.
CPC ............ *F16D 65/18* (2013.01); *B60B 19/003* (2013.01); *B60B 2900/3312* (2013.01); *F16D 2121/20* (2013.01); *F16D 2121/24* (2013.01); *F16D 2125/24* (2013.01); *F16D 2125/36* (2013.01); *F16D 2125/64* (2013.01); *F16D 2125/68* (2013.01); *F16D 2127/02* (2013.01)

(56) References Cited

U.S. PATENT DOCUMENTS

| | | | |
|---|---|---|---|
| 2018/0361784 A1* | 12/2018 | Zapf ................... | B60K 7/0007 |
| 2019/0144036 A1* | 5/2019 | Geiger .................. | B62D 15/00 |
| | | | 180/6.5 |
| 2020/0391545 A1* | 12/2020 | Moore ................... | B60B 19/12 |
| 2024/0351369 A1* | 10/2024 | Blom-Bakke .......... | B60B 19/12 |

* cited by examiner

APPARATUS AND METHOD FOR BRAKING MECANUM WHEELS

CROSS-REFERENCE TO RELATED APPLICATIONS

This application claims the benefit of U.S. Provisional Patent Application No. 63/443,040 of the same title, filed Feb. 2, 2023, the contents of which are hereby incorporated by reference herein in their entirety.

FIELD OF THE INVENTION

This invention relates to the field of braking mechanisms for omnidirectional or mecanum wheels.

BACKGROUND OF THE INVENTION

Mecanum wheels (U.S. Pat. No. 3,876,255, incorporated herein by reference) are used to drive mobile robots and motorized wheelchairs, among other applications. They allow for movement in any direction, as well as rotation, from a standing start. Omnidirectional wheels (U.S. Pat. No. 3,789,947, incorporated herein by reference) similarly allow movements in both the direction of the wheel rim and perpendicular to it (see FIG. 1). But both mecanum and omnidirectional wheels work using rollers that move freely on the ground, even if the wheels themselves are not rotating, so they cannot use normal wheel brakes. An effective braking apparatus for mecanum or omnidirectional wheels could provide a parking brake for motorized wheelchairs, so they don't roll down slopes, and also give them more traction to move up slopes—both improving user safety. Such an apparatus could also improve safety, security, and traction for mobile and warehouse robots, as well as provide an advantage for competitive robotics teams by preventing other robots from pushing the braked robot around, and by providing extra traction to achieve objectives even when other robots are in the way.

SUMMARY OF THE INVENTION

The present invention provides an apparatus and method for the braking of mecanum or omnidirectional wheels. In some embodiments, a servo or motor actuates a thrust bearing, which presses on a plastic plate with teeth to create friction with the rollers of the mecanum or omnidirectional wheels. A small spring on the wheel shaft prevents the teeth from engaging the rollers until the servo is activated. The apparatus and method can work even while the mecanum or omnidirectional wheels are being driven and rotating, to provide extra traction.

DESCRIPTION OF PREFERRED EMBODIMENTS

Figure 1:
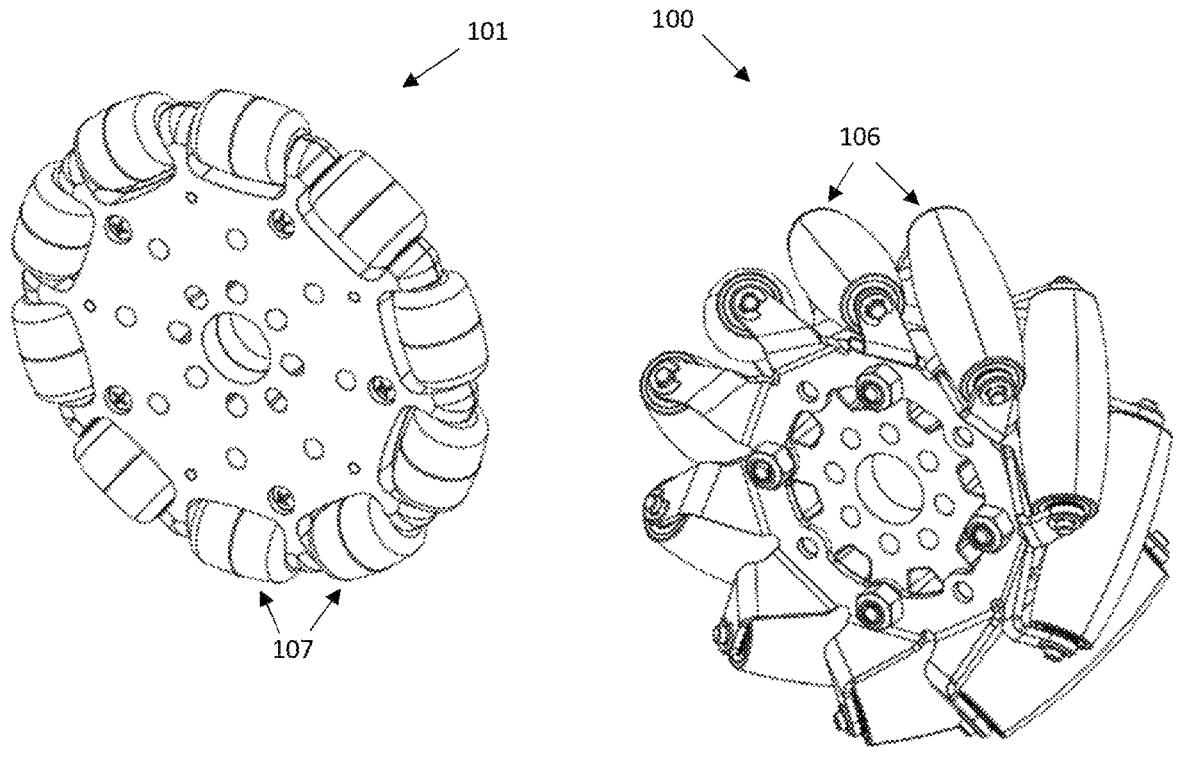
FIG. 1 shows an example of an omnidirectional wheel 101 and a mecanum wheel 100. The omni wheel has independent rollers 107 along its perimeter so it can freely move laterally while being driven forward or backward. The mecanum wheel has independent rollers 106 at 45° angles, so that a rectangular robot, wheelchair, or other platform with four such wheels in the proper orientations can be driven in any direction, or turn in place, simply by driving each wheel at the proper relative speed.
Figure 2:
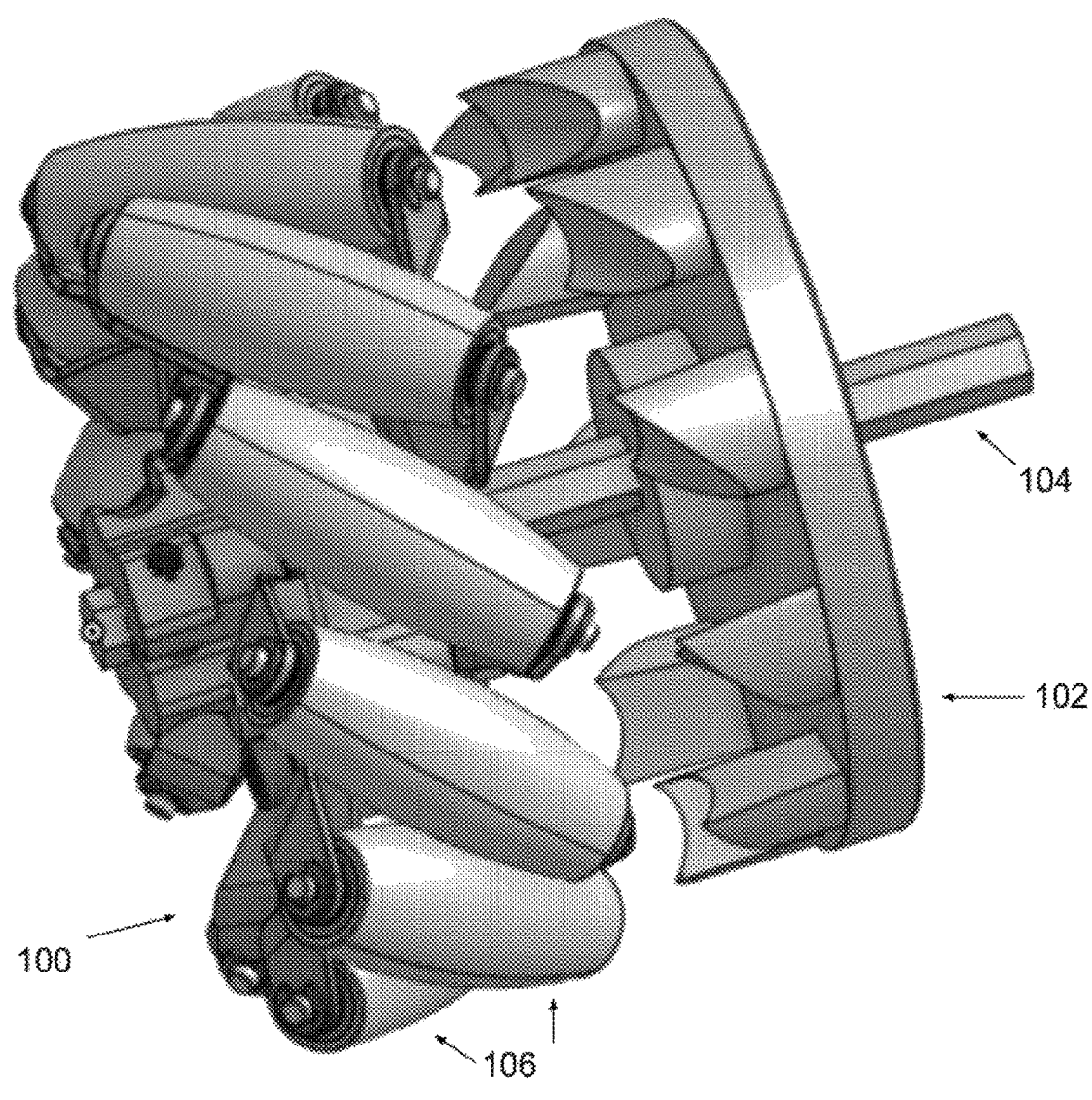
FIG. 2 shows an embodiment of a toothed plate 102 that can slide along a driveshaft 104 to engage the rollers 106 of a mecanum wheel 100 and prevent the rollers 106 from moving.
Figure 3:
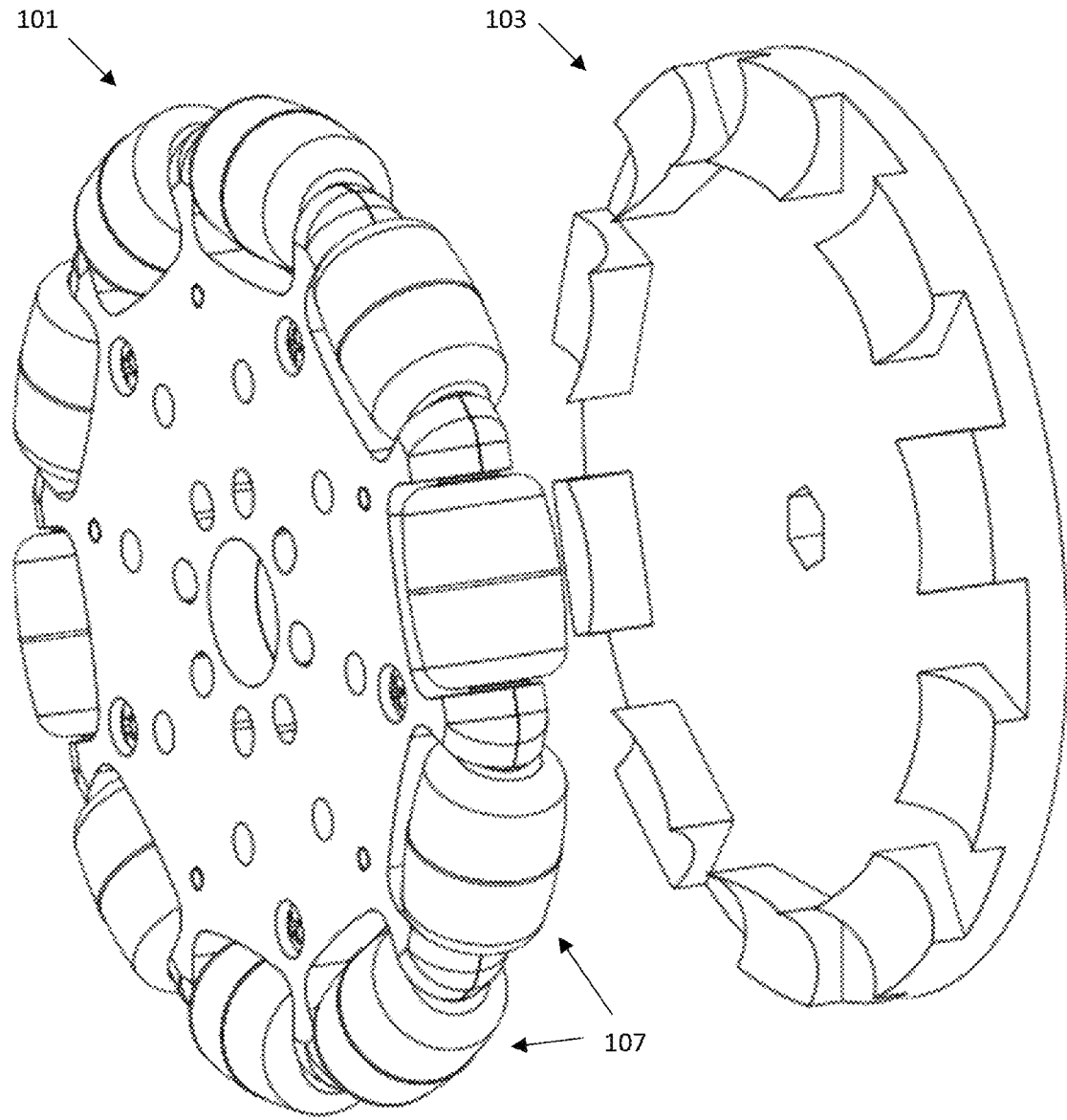
FIG. 3 shows another embodiment of a toothed plate 103 that can engage the rollers 107 of an omnidirectional wheel 101.
Figure 4:
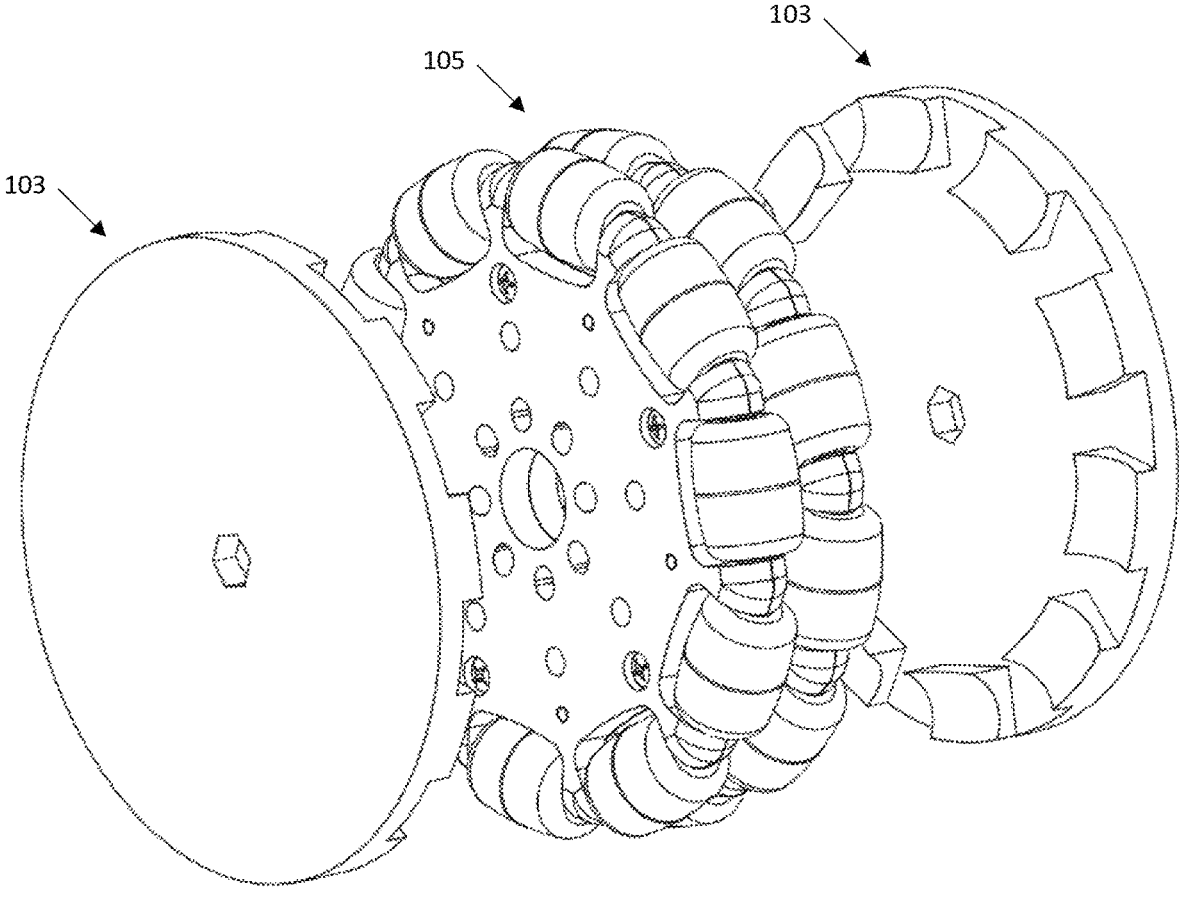
FIG. 4 shows another embodiment, in which two toothed plates 103 engage each side of a double-roller omnidirectional wheel 105 preventing any of the rollers 107 from moving.
Figure 5:
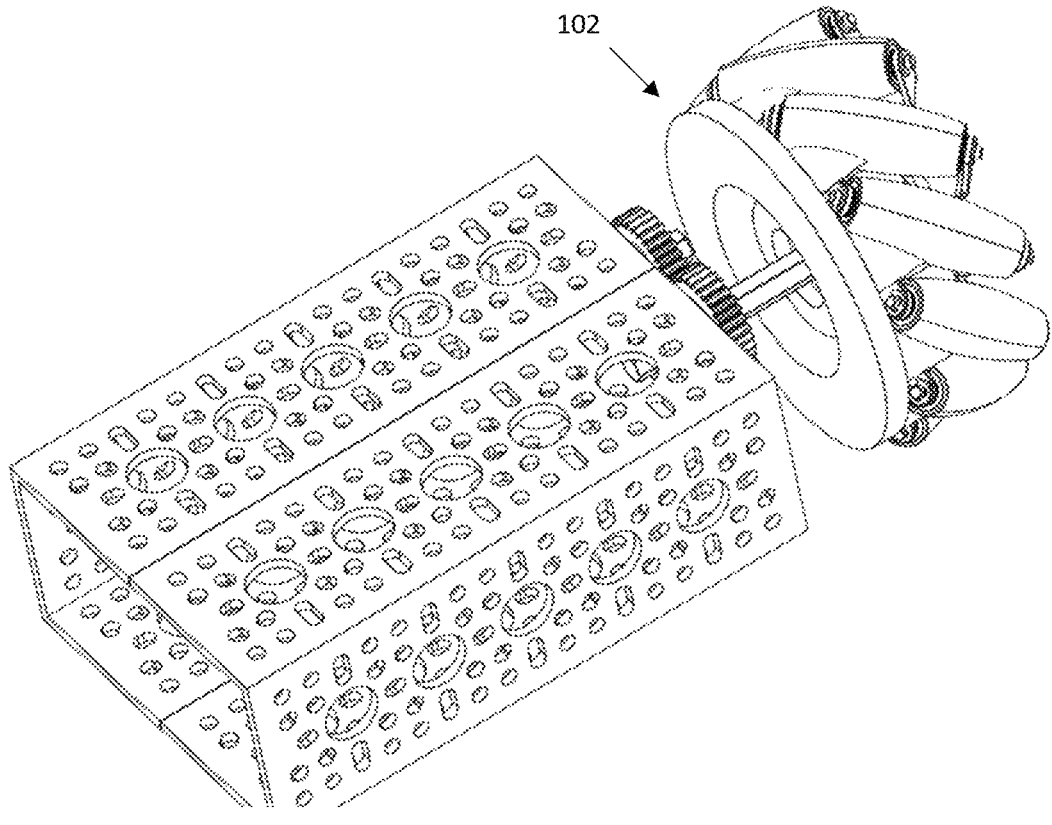
FIG. 5 shows another embodiment of a toothed plate 102, with a central recessed area to accommodate a thrust bearing.
Figure 6:
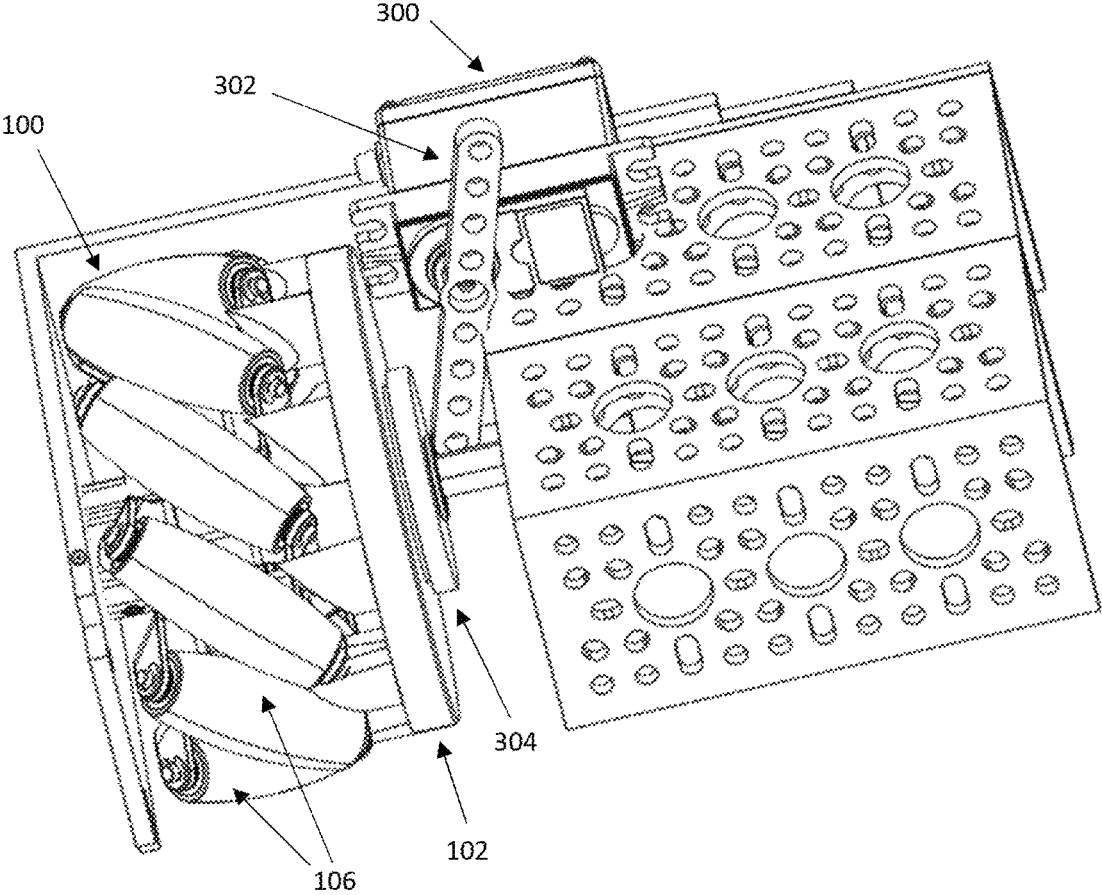
FIG. 6 shows one embodiment of a servo 300 with rotating arm 302 pressing a thrust bearing 304 to engage the toothed plate 102 against the rollers 106 of a mecanum wheel 100.
Figure 7:
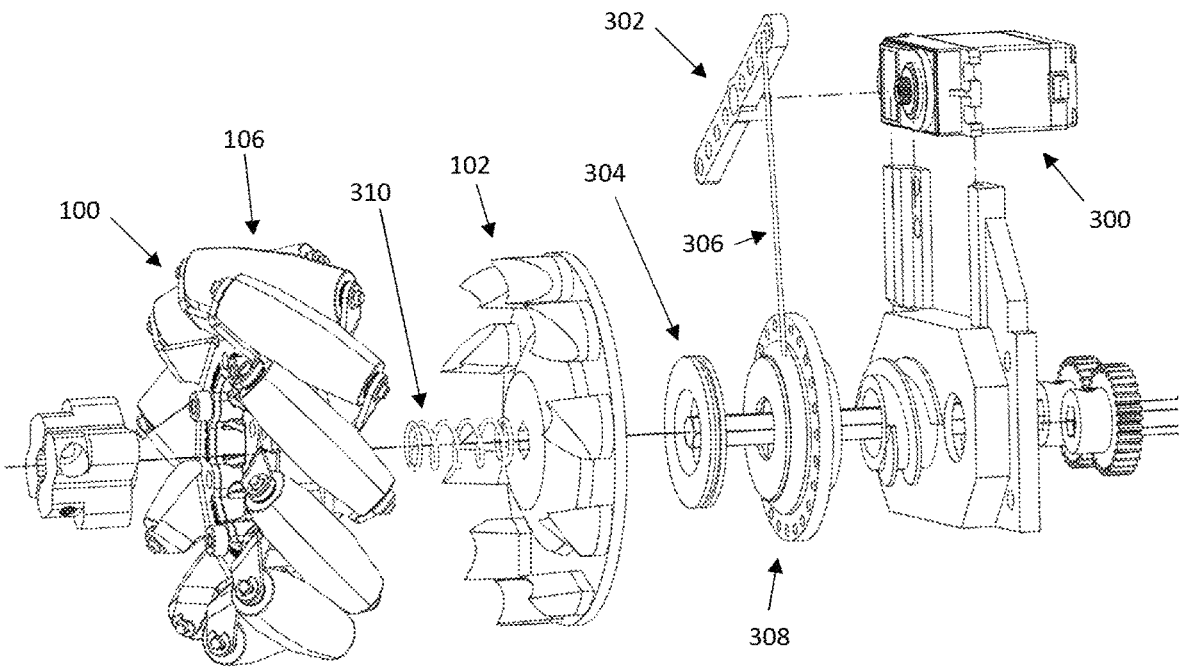
FIG. 7 shows another embodiment, where the servo 300 with rotating arm 302 uses wires or cables 306 to twist a screw plate 308 to press a thrust bearing 304 to engage the toothed plate 102, which is normally kept away from the rollers 106 by a compression spring 310.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The apparatus of the mecanum or omnidirectional wheel brake employs a roller braking system and an activation system. In some embodiments, the roller braking system is comprised of a plate with small rods, teeth, or wedges to engage and create friction with the rollers, acting as a brake and causing them to stop spinning. The plate can be a range of diameters, not exceeding the diameter of the mecanum or omnidirectional wheels, and not too small as to make the function of the apparatus impossible.

In some embodiments, the rods, teeth, or wedges can be curved, flat, or some other shape, as long as the shape serves the purpose of creating enough friction to stop the rotation of the mecanum or omnidirectional wheel rollers.

In some embodiments, each rod, tooth, or wedge creates friction by pressing itself between a roller and another fixed part of the mecanum or omnidirectional wheel, which could be a bracket or part of the wheel hub itself.

In some embodiments, each roller can be braked by an internal mechanism mounted inside the roller, or an external mechanism mounted on the wheel itself.

In other embodiments, the braking mechanisms can be mounted on one or more sliding plate(s) that rotate(s) at the same speed as the wheel.

The drivetrain axle on which the plate slides can be a variety of diameters and cross sections including, but not limited to, English and metric D-shafts of various diameters, and English and metric hex shafts of various diameters.

The mecanum or omnidirectional wheel that would be braked could be of various sizes and designs. The drawings depict an apparatus for braking goBilda mecanum wheels #3213-3606-0002 or omnidirectional wheels #3604-0014-0096, however, a person skilled in the art will appreciate that the present invention could easily be modified to brake mecanum or omnidirectional wheels from REV, AndyMark, Vex, or any other design or manufacturer.

In some embodiments, the thrust bearing is recessed into the roller-activation plate or frame, with retaining clips to hold it in place but allow free rotation.

In some embodiments, the activation system employs a servo or motor to apply force to the thrust bearing and/or the roller activation system.

In some embodiments, the activation system applies force to a lever that pushes on the thrust bearing. The lever is mounted so that it hinges on the robot or wheelchair frame. The lever can have one or more small nubs that press the thrust bearing when force is applied to it.

In some embodiments, a rack and pinion system can be used to apply force to the thrust bearing. A rack could be mounted near the drive axle, attached to a bearing so that the drive axle could rotate within it. One or more standard pinion gears could be powered by a servo and move the rack to press the thrust bearing.

In some embodiments, a worm gear could be used as the pinion in a rack and pinion system.

In some embodiments, a spring would passively disengage the roller braking system from the rollers as soon as the activation system allows, and the spring would normally prevent the roller braking system from engaging the rollers.

In other embodiments, an apparatus would actively disengage the roller braking system from the rollers.

In some embodiments, the activation system applies force to one or more mechanical linkages that transfer the force to the thrust bearing. The linkages can be L-shaped, where the activation system pulls or pushes at the joint where the tips of two L pieces connect to each other. When the brake is fully engaged, the long arms of the Ls are parallel with the drive axle, and the bases of the Ls are flush with the thrust bearing and the chassis, to maximize the pushing force and prevent the Ls from being moved "over center" and reducing the pushing force. When the activation system is disengaged, the bases of the Ls move toward each other.

In some embodiments, the activation system rotates one or more cams that contact and push the thrust bearing.

In some embodiments, the roller braking system is attached to the wheel with a tension spring, and the activation system prevents engagement of the roller braking system until desired.

In some embodiments, the activation system is inside the hub of the mecanum or omnidirectional wheel, and pushes rods, teeth, or wedges outward between the rollers.

In some embodiments, the activation system inside the hub uses a servo or motor with a wheel that has one rod per roller attached to its outer edge at one end, tangent to the servo wheel. When the servo is activated and the wheel rotates, the rods push outward and engage between the mecanum wheel rollers.

It will be apparent to anyone skilled in the art that the invention can be customized in various ways, and to fit many different shapes and sizes of mecanum or omnidirectional wheels, without departing from the scope of the present description and claims.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for braking a mecanum or omnidirectional wheel independent of a wheel driveshaft, the apparatus comprising:
   a roller braking system to prevent rotation of a plurality of mecanum or omnidirectional rollers, the roller braking system comprising a first plate or frame with rods, teeth or wedges that each insert between two adjacent of the rollers from a first side of the rollers when the roller braking system is engaged and a second plate or frame with rods, teeth, or wedges that each insert between two adjacent of the rollers from a second side of the rollers when the roller braking system is engaged, and
   an activation system comprising
   at least one servo or powered mechanism, independent of the wheel driveshaft, to engage the roller braking system.

2. The apparatus of claim 1, wherein the roller braking system comprises individual rods, teeth, or wedges that each insert between the rollers and a bracket that holds a neighboring roller.

3. The apparatus of claim 1, wherein the roller braking system has one or more springs to passively disengage the roller braking system from the rollers, when the roller braking system is not activated.

4. The apparatus of claim 1, wherein the roller braking system is attached to the wheel with one or more tension springs, and the activation system prevents engagement of the roller braking system until desired.

5. The apparatus of claim 1, wherein the activation system uses at least one thrust bearing to press against the roller braking system to engage the rollers.

6. The apparatus of claim 5, wherein the one or more thrust bearings is kept centered on the driveshaft by means of a rotational bearing within which the driveshaft spins.

7. The apparatus of claim 5, wherein the thrust bearing is mounted on the roller braking system, with retaining clips to hold the thrust bearing in place but allow free rotation.

8. The apparatus of claim 5, wherein the thrust bearing is mounted on the activation system, with retaining clips to hold the thrust bearing in place but allow free rotation.

9. The apparatus of claim 1, wherein the activation system transmits force from the at least one motor or servo to the at least one thrust bearing.

10. The apparatus of claim 1, wherein one or more gear racks are mounted parallel to the drive shaft, and one or more pinion gears powered by the activation system apply force to the thrust bearing via the one or more gear racks.

11. The apparatus of claim 1, wherein one or more levers powered by the activation system apply force to the one or more thrust bearings.

12. The apparatus of claim 1, wherein one or more cam wheels powered by the activation system apply force to the one or more thrust bearings.

13. The apparatus of claim 1, wherein one or more mechanical linkages powered by the activation system apply force to the one or more thrust bearings.

14. The apparatus of claim 1, wherein one or more slides connect the chassis of a robot, wheelchair, or platform to the one or more thrust bearings, keeping the thrust bearings and the linkages in the same orientation to a chassis even as the activation system applies the force.

15. The apparatus of claim 1, wherein the plurality of rollers comprising two groups of rollers offset from each other.

16. The apparatus of claim 1, wherein the rods, teeth, or wedges are curved or flat.

17. The apparatus of claim 1, wherein one or more gear racks are mounted parallel to the drive shaft, and one or more worm gears powered by the activation system apply force to the thrust bearing via the one or more gear racks.

18. The apparatus of claim 1, wherein the activation system applies force to one or more mechanical linkages that transfer the force to the thrust bearing.

19. An apparatus for a braking mecanum or omnidirectional wheel independent of a wheel driveshaft, the apparatus comprising:

a roller braking system to prevent rotation of a plurality of mecanum or omnidirectional rollers, when the roller braking system is engaging, and an activation system comprising a servo or powered mechanism, independent of the wheel driveshaft, to engage the roller braking system, wherein the roller braking system comprises individual rods, teeth, or wedges that insert between each adjacent ones of the rollers by being pushed outward from a central hub of the mecanum or omnidirectional wheel to a location between the adjacent rollers.

\* \* \* \* \*